US010650005B2

(12) United States Patent
Lim et al.

(10) Patent No.: US 10,650,005 B2
(45) Date of Patent: May 12, 2020

(54) PREDICTING USER NEEDS FOR A PARTICULAR CONTEXT

(71) Applicant: Google LLC, Mountain View, CA (US)

(72) Inventors: Yew Jin Lim, Cupertino, CA (US); James Kunz, Los Altos, CA (US); Joseph Garrett Linn, Mountain View, CA (US); Charles Jordan Gilliland, Mountain View, CA (US); David Faden, Mountain View, CA (US); Sanjit Jhala, San Jose, CA (US)

(73) Assignee: Google LLC, Mountain View, CA (US)

( * ) Notice: Subject to any disclaimer, the term of this patent is extended or adjusted under 35 U.S.C. 154(b) by 243 days.

(21) Appl. No.: 15/908,473

(22) Filed: Feb. 28, 2018

(65) Prior Publication Data

US 2018/0189358 A1    Jul. 5, 2018

Related U.S. Application Data

(63) Continuation of application No. 14/721,613, filed on May 26, 2015, now Pat. No. 9,940,362.

(51) Int. Cl.
*G06F 16/2457* (2019.01)
*G06F 16/29* (2019.01)
(Continued)

(52) U.S. Cl.
CPC .. *G06F 16/24575* (2019.01); *G06F 16/24578* (2019.01); *G06F 16/29* (2019.01); *G06F 16/955* (2019.01); *G06F 16/9535* (2019.01)

(58) Field of Classification Search
CPC .. G06F 16/9535; G06F 16/29; G06F 16/2457; G06F 16/955
(Continued)

(56) References Cited

U.S. PATENT DOCUMENTS 8,051,076 B1    11/2011    Garg et al.
8,301,639 B1    10/2012    Myllymaki et al.
(Continued)

FOREIGN PATENT DOCUMENTS

CN    102667839    9/2012
CN    103646020    3/2014
(Continued)

OTHER PUBLICATIONS

White et al., "Predicting Short-Term Interests Using Activity-Based Search Context," CIKM'10, ACM, Oct. 23-30, 2010, 10 pp.
(Continued)

*Primary Examiner* — Jay A Morrison
*Assistant Examiner* — Ken Hoang
(74) *Attorney, Agent, or Firm* — Middleton Reutlinger

(57) ABSTRACT

A computing system is described that identifies, based on search histories associated with a group of computing devices for a particular context, a task performed by users of the group of computing devices for the particular context. The computing system determines a first degree of likelihood of the task being performed by the users of the group of computing devices for the particular context and determines a second degree of likelihood of the task being performed by the users of the group of computing devices for a broader context that includes the particular context and at least one other context. Responsive to determining that the first degree of likelihood exceeds the second degree of likelihood by a threshold amount, and that a current context of a particular computing device corresponds to the particular context, the computing system transmits, to the particular computing device, information for completing the task for the particular context.

17 Claims, 5 Drawing Sheets

(51) Int. Cl.
 G06F 16/955 (2019.01)
 G06F 16/9535 (2019.01)
(58) Field of Classification Search
 USPC ....... 707/706, 722, 728, 748, 767, 751, 692, 707/707, 723, 724, 738, 768, 770, 776; 705/26.7, 26.62, 26.8, 12, 14.25, 14.41, 705/14.54, 14.66, 26.1, 26.43, 26.61, 705/27.1, 30, 321, 35, 5, 7.13; 706/12, 706/50, 46, 47
 See application file for complete search history.

(56) References Cited

U.S. PATENT DOCUMENTS

| | | | |
|---|---|---|---|
| 2006/0143159 | A1 | 6/2006 | Chowdhury et al. |
| 2008/0027961 | A1 | 1/2008 | Arlitt et al. |
| 2009/0171942 | A1 | 7/2009 | Suresh et al. |
| 2009/0177645 | A1 | 7/2009 | Heck |
| 2010/0082582 | A1 | 4/2010 | Gao et al. |
| 2012/0014675 | A1 | 1/2012 | Previtali et al. |
| 2012/0158685 | A1 | 6/2012 | White |
| 2012/0284256 | A1 | 11/2012 | Mahajan et al. |
| 2013/0024453 | A1* | 1/2013 | Duke ............ G06F 16/9535 707/737 |
| 2013/0036117 | A1 | 2/2013 | Fisher et al. |
| 2013/0254329 | A1 | 9/2013 | Lin et al. |
| 2014/0188956 | A1 | 7/2014 | Subba et al. |
| 2015/0006553 | A1 | 1/2015 | Li et al. |
| 2015/0073693 | A1 | 3/2015 | Yang et al. |
| 2016/0335355 | A1 | 11/2016 | Vandanapu et al. |

FOREIGN PATENT DOCUMENTS

| | | |
|---|---|---|
| CN | 104391967 | 3/2015 |
| CN | 104520881 | 12/2017 |
| CN | 103886090 | 1/2018 |
| JP | 2002236699 | 8/2002 |
| JP | 2002269129 | 9/2002 |
| JP | 2009110466 | 5/2009 |
| JP | 2010287048 | 12/2010 |
| JP | 2013218578 | 10/2013 |
| JP | 2015035214 | 2/2015 |
| WO | 2014078809 | 5/2014 |

OTHER PUBLICATIONS

Hong et al., "Context-aware system for proactive personalized service based on context history," Expert Systems with Applications, vol. 36, No. 4, Dec. 25, 2008, 10 pp.

Lane et al., "Hapori: Context-based Local Search for Mobile Phones using Community Behavioral Modeling and Similarity," Ubicomp 2010, ACM, Sep. 26-29, 2010, 10 pp.

Olivarez-Giles, "'Google Now' Will Suck in Outside App Data," The Wall Street Journal, Jan. 30, 2015, 3 pp.

International Search Report and Written Opinion of International Application No. PCT/US2016/027074, dated Jun. 29, 2016, 16 pp.

Belkin, "Helping People Find What They Don't Know," Communications of the ACM vol. 43, No. 8, Aug. 2000, pp. 58-61.

Warshaw, "A New Model for Predicting Behavioral Intentions: An Alternative to Fishbein," Journal of Marketing Research, vol. XVII, May 1980, pp. 153-172. May 1980.

Adomavicius et al., "Context-Aware Recommender Systems," Proceedings of the 2008 ACM Conference on Recommender Systems, Oct. 23-25, 2008, Switzerland, pp. 1-37.

Radwan, "Predicting behavior from actions in the past," 2KnowMySelf, 2014, Retrieved from: <http://www.2knowmyself.com/predicting_behavior_from_actions_in_the_past> 3 pp.

Belkin et al., "Relevance Feedback versus Local Context Analysis as Term Suggestion Devices: Rutgers' TREC-8 Interactive Track Experience," Proceedings of 8th Text Retrieval Conference, Washington D.C.; NIST, pp. 1-9. Retrieved on Apr. 15, 2015.

Belkin, "Intelligent Information Retrieval: Whose Intelligence?" Proceedings of the Fifth International Symposium for Information (ISI '96), 1996, 6 pp.

Levy, "Siri's Inventors are Building a Radical New AI That Does Anything You Ask," WIRED, Retrieved from: Retrieved from: http://www.2knowmyself.com/predicting_behavior_from_actions_in_the_past Aug. 12, 2014, 20 pp.

Viv Labs, "Viv: The Global Brain," Viv Labs, Retrieved from: http://viv.ai/ 2015, 4 pp.

White et al., "Predicting User Interests from Contextual Information," Proceedings of the 32nd International ACM SIGIR conference on Research and Development in Information Retrieval, Jul. 19-23, 2009, Boston, MA, 8 pp.

Japanese Patent Office; Notice of Grant of Application No. JP2017-551040; 6 pages; dated Dec. 4, 2018.

Korean Intellectual Property Office; Grant of Patent issued in Application No. 2017-7027990 dated Mar. 21, 2019.

Korean Intellectual Property Office, Notice of Preliminary Rejection issued in KR Application No. 10-2017-7027990; dated Aug. 17, 2018.

European Patent Office, Examination Report issued in EP Application No. 16719996.7; dated Sep. 4, 2018.

China National Intellectual Property Administration; Office Action issued in Application No. 201680019076.6; 27 pages; dated Mar. 3, 2020.

* cited by examiner

PREDICTING USER NEEDS FOR A PARTICULAR CONTEXT

BACKGROUND

When a user is in an unfamiliar situation, the user may turn to a computing device for obtaining information and facts that might assist the user in accomplishing a certain task to achieve a particular goal. Some computing devices require that the user be able to provide sufficient information (e.g., search query terms) for guiding the computing device in locating the particular information that the user is searching for. Unfortunately, the user may be unaware of the tasks the user may need to complete, much less the information for which the user should search, in order to successfully navigate through the unfamiliar situation and achieve the particular goal. Consequently, without prior knowledge of various actions that the user may need to perform, the user may experience stress and waste valuable time and resources inputting information into a computing device and guessing search terms, as the user tries to obtain information necessary to achieve a particular goal.

SUMMARY

In one example, the disclosure is directed to a method that includes identifying, by a computing system, based on search histories associated with a group of computing devices for a particular context, a task performed by users of the group of computing devices for the particular context, determining, by the computing system, a first degree of likelihood of the task being performed by the users of the group of computing devices for the particular context, and determining, by the computing system, a second degree of likelihood of the task being performed by the users of the group of computing devices for a broader context that includes the particular context and at least one other context. The method further includes responsive to determining that the first degree of likelihood exceeds the second degree of likelihood by a threshold amount, and that a current context of a particular computing device corresponds to the particular context, transmitting, by the computing system, to the particular computing device, information for completing the task for the particular context.

In another example, the disclosure is directed to a computing system that includes at least one processor and at least one module operable by the at least one processor to identify, based on search histories associated with a group of computing devices for a particular context, a task performed by users of the group of computing devices for the particular context, determine a first degree of likelihood of the task being performed by the users of the group of computing devices for the particular context, and determine a second degree of likelihood of the task being performed by the users of the group of computing devices for a broader context that includes the particular context and at least one other context. The at least one module is further operable by the at least one processor to responsive to determining that the first degree of likelihood exceeds the second degree of likelihood by a threshold amount, and that a current context of a particular computing device corresponds to the particular context, transmit, to the particular computing device, information for completing the task for the particular context.

In another example, the disclosure is directed to a computer-readable storage medium including instructions that, when executed, configure one or more processors of a computing system to identify, based on search histories associated with a group of computing devices for a particular context, a task performed by users of the group of computing devices for the particular context, determine a first degree of likelihood of the task being performed by the users of the group of computing devices for the particular context, and determine a second degree of likelihood of the task being performed by the users of the group of computing devices for a broader context that includes the particular context and at least one other context. The instructions, when executed, further configure the one or more processors of the computing system to responsive to determining that the first degree of likelihood exceeds the second degree of likelihood by a threshold amount, and that a current context of a particular computing device corresponds to the particular context, transmit, to the particular computing device, information for completing the task for the particular context.

The details of one or more examples are set forth in the accompanying drawings and the description below. Other features, objects, and advantages of the disclosure will be apparent from the description and drawings, and from the claims.

DETAILED DESCRIPTION

In general, techniques of this disclosure may enable a computing system to learn and predict the needs of a user of a computing device, for a particular context, given the previous actions of other users of other computing devices, for the particular context. Based on contextual information of the user (e.g., the location, time, user interests, and the like) the system may infer a task or an action the user may need to perform and automatically provide information that users of other computing devices, in similar contexts, have needed, in order to complete the task or perform the action. The computing system may rank the information the computing system provides for completing a task or performing an action by determining degrees of usefulness of the information for different contexts. The computing system may provide the information for completing a task or performing an action if the degree of usefulness for the particular context is sufficiently greater than the degree of usefulness for performing the action other contexts.

Throughout the disclosure, examples are described where a computing device and/or a computing system analyzes information (e.g., context, locations, speeds, search queries, etc.) associated with a computing device and a user of a computing device, only if the computing device receives permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

Figure 1:
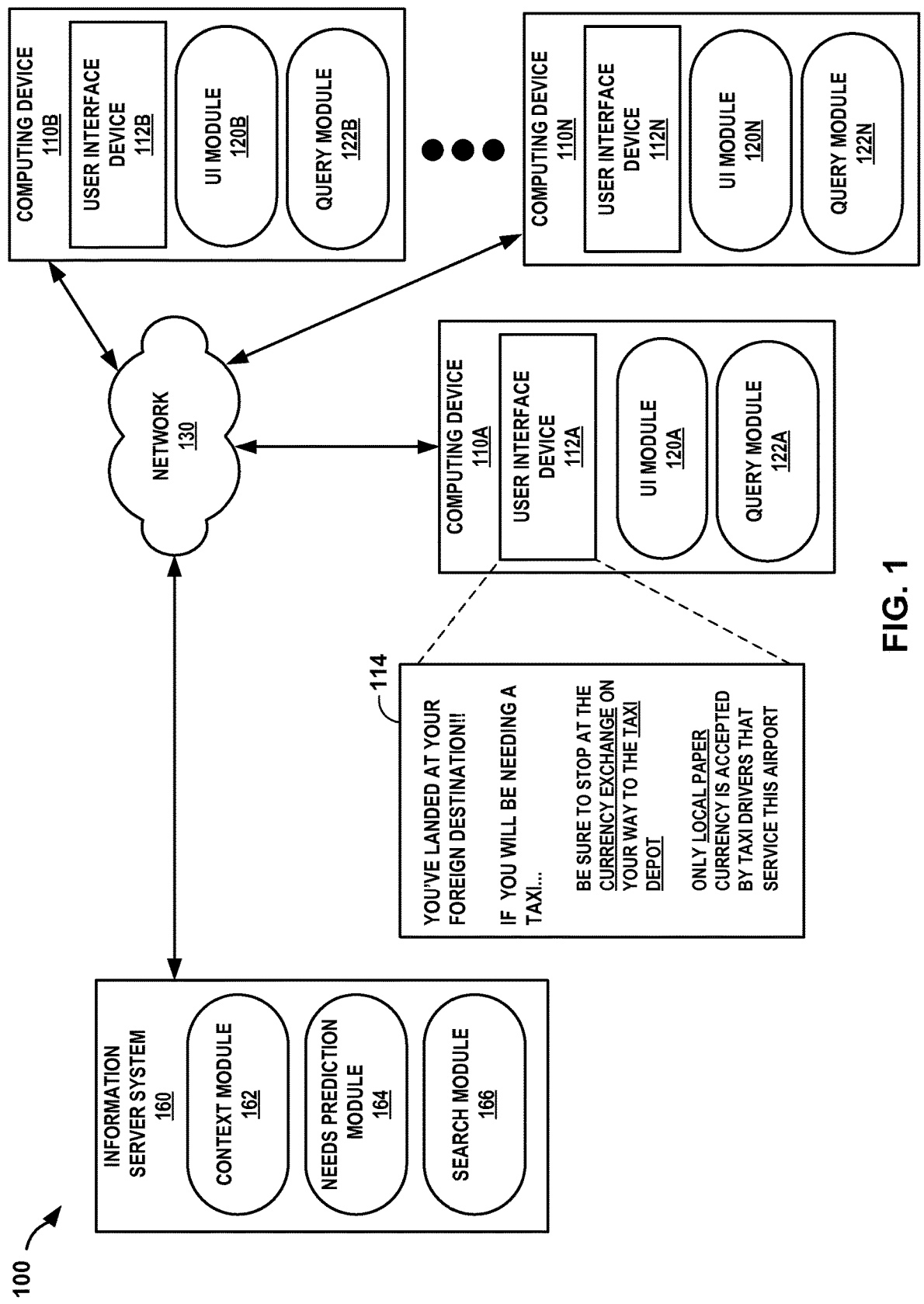
FIG. 1 is a conceptual diagram illustrating an example system for predicting the needs of a user of a computing device and providing information for satisfying the needs, in accordance with one or more aspects of the present disclosure.

FIG. 1 is a conceptual diagram illustrating system 100 as an example system for predicting the needs of a user of computing device 110A and providing information for satisfying the needs, in accordance with one or more aspects of the present disclosure. System 100 includes information server system ("ISS") 160 in communication with computing devices 110A-110N (collectively, "computing devices 110") via network 130.

Network 130 represents any public or private communications network, for instance, cellular, Wi-Fi, and/or other types of networks, for transmitting data between computing systems, servers, and computing devices. Network 130 may include one or more network hubs, network switches, network routers, or any other network equipment, that are operatively inter-coupled thereby providing for the exchange of information between ISS 160 and computing devices 110. Computing devices 110 and ISS 160 may transmit and receive data across network 130 using any suitable communication techniques.

ISS 160 and computing devices 110 may each be operatively coupled to network 130 using respective network links, and computing devices 10N may be operatively coupled to network 30B using a different network link. The links coupling computing devices 110 and ISS 160 to network 130 may be Ethernet, ATM or other types of network connections, and such connections may be wireless and/or wired connections.

Computing devices 110 each represent individual mobile devices, such as a mobile phone, a tablet computer, a laptop computer, computerized watch, computerized eyewear, computerized gloves, or any other type of portable computing device. Additional examples of computing devices 110 include personal digital assistants (PDA), portable gaming systems, media players, e-book readers, mobile television platforms, automobile navigation and entertainment systems, or any other types of mobile, wearable and non-wearable computing devices configured to receive information via a network, such as network 130.

Each of computing devices 110 includes a respective user interface device 112A-112N (collectively "UIDs 112") and a respective user interface (UI) module 120A-120N (collectively "UI modules 120"). In addition, each of computing devices 110 includes a respective query module 122A-122N (collectively "query modules 122"). Modules 120-122 may perform operations described using software, hardware, firmware, or a mixture of hardware, software, and firmware residing in and/or executing at respective computing devices 110. Computing devices 110 may execute respective modules 120-122 with multiple processors or multiple devices. Computing devices 110 may execute respective modules 120-122 as virtual machines executing on underlying hardware. Modules 120-122 may execute as one or more services of an operating system or computing platform. Modules 120-122 may execute as one or more executable programs at an application layer of a computing platform.

Computing devices 110B-110N constitute a group of computing devices from which respective users associated with computing devices 110B-110N may perform searches for information. In some examples, computing device 110A is included in the group with computing devices 110B-110N and a user associated with computing device 110A may also perform searches for information from computing device 110A. In other examples the group of computing devices 110B-110N excludes computing device 110A.

UIDs 112 of computing devices 110 may function as respective input and/or output devices for computing devices 110. UIDs 112 may be implemented using various technologies. For instance, UIDs 112 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. In addition, UIDs 112 may include microphone technologies, infrared sensor technologies, or other input device technology for use in receiving user input.

UIDs 112 may function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing devices 110. In addition, UIDs 112 may include speaker technologies, haptic feedback technologies, or other output device technology for use in outputting information to a user.

UIDs 112 may each include respective presence-sensitive displays that may receive tactile input from a user of respective computing devices 110. UIDs 112 may receive indications of tactile input by detecting one or more gestures from a user (e.g., the user touching or pointing to one or more locations of UIDs 112 with a finger or a stylus pen). UIDs 112 may present output to a user, for instance at respective presence-sensitive displays. UIDs 112 may present the output as respective graphical user interfaces (e.g., user interface 114), which may be associated with functionality provided by computing devices 110. For example, UIDs 112 may present various user interfaces (e.g., user interface 114) related to search functions provided by query modules 122 or other features of computing platforms, operating systems, applications, and/or services executing at or accessible from computing devices 110 (e.g., electronic message applications, Internet browser applications, mobile or desktop operating systems, etc.).

UI modules 120 manage user interactions with respective UIDs 112 and other components of computing devices 110. UI modules 120 may cause UIDs 112 to output respective user interfaces, such as user interface 114 (or other example user interfaces) for display, as users of computing devices 110 view output and/or provides input at UIDs 112. UI modules 120 and UIDs 112 may receive one or more indications of input from users as the users interact with the user interfaces, at different times and when the users and computing devices 110 are at different locations. UI modules 120 and UIDs 112 may interpret inputs detected at UIDs 112 and may relay information about the inputs detected at UIDs 112 to one or more associated platforms, operating systems, applications, and/or services executing at computing devices 110, for example, to cause computing devices 110 to perform functions.

UI modules 120 may receive information and instructions from one or more associated platforms, operating systems, applications, and/or services executing at computing devices 110 and/or one or more remote computing systems, such as ISS 160. In addition, UI modules 120 may act as intermediaries between the one or more associated platforms, operating systems, applications, and/or services executing at computing devices 110, various output devices of computing devices 110 (e.g., speakers, LED indicators, audio or electrostatic haptic output device, etc.) to produce output (e.g., a graphic, a flash of light, a sound, a haptic response, etc.) with computing devices 110.

In the example of FIG. 1, user interface 114 is a graphical user interface associated with needs prediction service provided by ISS 160 and accessed by computing device 110A. As described in detail below, user interface 114 includes graphical information (e.g., text), which represents information ISS 160 predicts that a user of computing device 110A may need at the current time to perform a task. User interface 14 may include various other types of graphical indications such as visual depictions of predicted information that a user of computing device 110A may need to perform a task for a current context. UI module 120A may cause UID 112A to output user interface 114 based on data UI module 120A receives via network 130 from ISS 160. UI module 120A may receive graphical information (e.g., text data, images data, etc.) for presenting user interface 114 as input from ISS 160 along with instructions from ISS 160 for presenting the graphical information within user interface 114 at UID 112.

Query modules 122 perform search related functions for computing devices 110. Query modules 122 may transmit search queries (e.g., character strings) via network 130 to ISS 160 and, in response, may obtain results of searches performed by ISS 160 based on the queries. Query modules 122 may receive indications of the search queries from UI modules 120 as users of computing devices 110 provide inputs at UIDs 112. Query modules 122 may output search results received from ISS 160 to UI modules 120, for instance, to cause UI modules 120 to present the search results as part of user interfaces UI modules 120 present at UIDs 112.

ISS 160 represents any suitable remote computing system, such as one or more desktop computers, laptop computers, mainframes, servers, cloud computing systems, etc. capable of sending and receiving information both to and from a network, such as network 130. ISS 160 hosts (or at least provides access to) both a search system for searching for information and a needs prediction system for predicting the needs of users of computing devices 110 for particular contexts.

Computing devices 110 may communicate with ISS 160 via network 130 to access the search system and needs prediction system provided by ISS 160. In some examples, ISS 160 represents a cloud computing system that provides search and needs prediction services through network 130 to one or more computing devices 110 that access the search and needs prediction services via access to the cloud provided by ISS 160.

In the example of FIG. 1, ISS 160 includes context module 162, needs prediction module 164, and search module 166. Modules 162-166 may perform operations described using software, hardware, firmware, or a mixture of hardware, software, and firmware residing in and/or executing at ISS 160. ISS 160 may execute modules 162-166 with multiple processors or multiple devices. ISS 160 may execute modules 162-166 as virtual machines executing on underlying hardware. Modules 162-166 may execute as one or more services of an operating system or computing platform. Modules 162-166 may execute as one or more executable programs at an application layer of a computing platform.

Context module 162 gathers contextual information related to computing devices 110 and provides the information to, and makes determinations based on the contextual information for, modules 164 and 166. For example, context module 162 may obtain location information associated with computing device 110A and determine whether the current location of computing device 110A coincides with a previous location from a location history of computing device 110A. Contextual module 162 may maintain contextual histories associated with each of computing devices 110 and determine whether a respective, current context associated with one or more of computing devices 110 matches a previous context found in a respective contextual history. For example, context module 162 may maintain, as part of a contextual history associated with computing device 110A, a location history that tracks where computing device 110A was located at a particular day or time.

Contextual module 162 may continuously update the current context and contextual history associated with computing devices 110 as contextual module 162 receives new and updated information. For instance, contextual module 162 may receive movement information gathered by sensors of computing device 110A and use the movement information to update the current location context module 162 maintains for computing device 110A.

Location and movement information is only some of the types of contextual information context module 162 may maintain for each of computing devices 110. As used throughout the disclosure, the term "contextual information" is used to describe any conceivable information that may be used by a computing system and/or computing device, such as ISS 160 and computing devices 110, to determine one or more environmental or behavioral characteristics associated with computing devices and/or users of computing devices.

For example, contextual information includes past, current, and future physical locations, degrees of movement, weather and traffic conditions, patterns of travel, and the like. In some examples, contextual information may include sensor information obtained by one or more sensors (e.g., gyroscopes, accelerometers, proximity sensors, etc.) of computing devices 110, radio transmission information obtained from one or more communication units and/or radios (e.g., global positioning system (GPS), cellular, Wi-Fi, etc.) of computing devices 110, information obtained by one or more input devices (e.g., cameras, microphones, keyboards, touchpads, mice, UID 112, etc.) of computing devices 110, and network/device identifier information (e.g., a network name, a device internet protocol address, etc.) of computing devices 110.

In addition, contextual information may include user topics of interest (e.g., a user's favorite "things" typically maintained as a user interest graph or some other type of data structure), contact information associated with users (e.g., a user's personal contact information as well as information about a user's friends, co-workers, social media connections, family, etc.), search histories, location histories, long and short term tasks, calendar information, application use histories, purchase histories, favorites, bookmarks, and other information that computing devices 110 and ISS 160 can gather about a user of computing devices 110.

Furthermore, contextual information may include information about the operating state of a computing device. For example, an application that is executed at a given time or in a particular location is an example of information about the operating state of a computing device. Other examples of contextual information based on the operating state of a computing device include, but are not limited to, positions of switches, battery levels, whether a device is plugged into a wall outlet or otherwise operably coupled to another device and/or machine, user authentication information (e.g., which user), whether a device is operating in "airplane" mode, in standby mode, in full-power mode, the operational state of radios, communication units, input devices and output devices, etc.

Context module 162 may provide the contextual information and make determinations about the contextual information context module 162 maintains, on behalf of other modules 164 and 166, as well as computing devices 110. For example, context module 162 may respond to a request from needs prediction module 164 of ISS 160 for contextual information associated with computing devices 110 by outputting, for transmission to needs prediction module 164, data maintained by context module 162 that specifies the contextual information (e.g., respective locations) associated with one or more of computing devices 110.

It should be understood that even though throughout the disclosure, examples are described where a computing device and/or a computing system analyzes contextual information, including location histories, context histories, and/or search histories, associated with a computing device and a user of a computing device, the computing devices and computing systems described herein may only analyze the contextual information if the computing device and/or computing system receives explicit permission from the user of the computing device to analyze the information. For example, in situations discussed herein, before a computing device or computing system can collect or may make use of information associated with a user, the user may be provided with an opportunity to provide input to control whether programs or features of the computing device and/or computing system can collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

Search module 166 executes searches for information (e.g., available using the Internet) based on search queries search module 166 receives from computing devices 110 and or modules 162 and/or 164. For example, search module 166 may perform an Internet search of a character string search module 166 receives from query module 122B as a user of computing device 110B interacts with computing device 110B to locate an online image of an airport terminal map. In response to the search, search module 166 may obtain a graphical image of the airport terminal map and output the graphical image back to computing device 110B.

Search module 166 may maintain one or more search histories of users of computing devices 110. The search histories maintained by search modules 166 may be part of, or separate from, the contextual histories maintained by context module 162. The search histories generated by search modules 166 may be sortable, and searchable, such that at a given time, search module 166 may analyze the search histories of one or more of computing devices 110 to determine what types of queries that users of computing devices 110 have been searching for. Search module 166 may provide module 162 and 164 with access to the search histories and/or may analyze the search histories and output information from the search histories on behalf of modules 162 and 164.

Needs prediction module 164 learns and predicts the needs of users of computing devices 110 for different contexts and may automatically provide information to computing devices 110 that users of other computing devices, in similar contexts, have needed, in order to complete a task or perform an action. For example, given previous actions (e.g., searches of certain queries) performed by a user of a computing device and/or other users of other computing devices, needs prediction module 164 may infer a task or an action the user may need to perform for a particular context.

Based on information needs prediction module 164 receives from context module 162 about current contexts of computing devices 110, need prediction module 164 may determine when a current context corresponds to a previous context in which users of computing devices 110 previously performed the task or action. Needs prediction module 164 may request search module 166 perform a search for information that may assist a user in completing the inferred action or task. Needs prediction module 164 may provide the information search module 166 finds for completing the task or performing the action to one or more of computing devices 110 for presentation to a user (e.g., as user interface 114 at one of UIDs 112).

A user "need" as referred to herein, may be defined as a semantically grouped pattern of user actions in a given context, based on observations by a system of user actions (e.g., in action logs such as search histories, purchase histories, application usage histories, and other contextual histories). Note that this is just an example definition for simplifying discussion of the model used by needs prediction module 164. By this example definition therefore, the tasks or actions may not necessarily be needs, rather observed actions taken or tasks performed may be a proxy by which needs prediction module 164 can use to infer the more general needs of users of computing devices 110.

Needs prediction module 164 is described in greater detail with respect to the additional FIGS. In summary, needs prediction module 164 may perform one or more machine learning techniques to learn the needs of users of computing devices 110 for different contexts. In other words, because needs prediction module 164 may be unable to directly learn the needs of users of computing devices 110, needs prediction module 164 models user needs. Needs prediction module 164 may receive contextual information from context module 162 as well as search history information from search module 166, and provide that information as inputs to the model for training the model to learn the needs of users for given contexts. Once trained, the model may receive a particular context as an input and, in response, output an indication (e.g., data) indicative of one or more tasks, actions, or other observable acts previously performed by other users for the particular context.

In accordance with the techniques of this disclosure, ISS 160 may identify, based at least in part on search histories (e.g., in addition to purchase histories, application usage, etc.) associated with a group of computing devices 110, for a particular context, a task performed by users of the group of computing devices 110 for the particular context. For example, a user of computing device 110A may visit a foreign country for the first time and take a flight to an airport in the foreign country. Upon arrival, computing device 110A may establish a connection, via network 130, with ISS 160.

Context module 162 may determine a current context of computing device 110A and share the current context with needs prediction module 164. Needs prediction module 164 may input the current context of computing device 110A into a model that needs prediction module 164 uses to infer one or more actions typically performed by other users of computing devices 110 given similar contexts. Needs prediction module 164 may identify, using the model, one or more tasks that users typically perform when visiting the airport of the foreign country.

In some examples, an example of an inferred task includes navigating to a particular location from a current location of computing device 110A. For example, the model of needs prediction module 164 may output data indicating that users typically search for taxis from the airport in the foreign country. Or in some examples, the model may output data indicating that users typically trigger execution of (e.g., open) a ground transportation related application from their respective one of devices 110 to order a taxi.

In any case, based on the information received from the model, needs prediction module 164 may determine that user of computing devices 110 typically need a taxi upon arrival at the airport and therefore, may infer that the user of computing device 110A may need a taxi. In some examples, needs prediction module 164 may simply request search module 166 perform a search based on the tasks or actions identified by the model. Needs prediction module 164 may then automatically output the search results (or information derived from the search results) to computing device 110A so that UI module 120A can alert the user that he or she may need to call a taxi.

In other examples however, needs prediction module 164 may perform some additional analysis on the information received from the needs model before sending information to computing device 110A. Simply put, needs prediction module 164 may determine whether a degree of likelihood (e.g., a probability, a count, etc.) of the task being performed for the particular context sufficiently outweighs a degree of likelihood of the task being performed for a broader context. In this way, needs prediction module 164 may only output needs information if the task that the user may have to perform is particularly out-of-the-ordinary or otherwise unique to a particular situation.

For example, the needs model of needs prediction module 164 may determine that users typically open an e-mail application from computing devices 110 when at a particular airport. However, the needs model of needs prediction module 164 may determine that users typically open the same e-mail application from computing devices 110 for other contexts, including the airport and a large geographical area that surrounds the particular airport. Needs prediction module 164 may determine that the likelihood of opening the e-mail application upon arrival at the airport in the foreign country is similar to the degree of likelihood of opening the e-mail application outside the airport in the foreign country. Therefore, needs prediction module 164 may determine that the user of computing device 110A need not care about receiving an alert to check his or her e-mail since the "need" may not be of sufficient interest to interrupt or otherwise proactively alert the user.

To determine whether information for a need to satisfy a particular task will be of sufficient interest to interrupt a user, the needs model of needs prediction module 164 may compare a first degree of likelihood of the task being performed by the users of the group of computing devices 110 for the particular context to a second degree of likelihood of the task being performed by the users of the group of computing devices 110 for a broader context that includes the particular context and at least one other context. For example, needs prediction module 164 may determine that seventy-five percent of users of computing devices 110 execute searches for ground transportation when the users are located at the airport in the foreign country and that only twenty percent of users of computing devices 110 execute the same search for ground transportation when the users are located anywhere within the foreign country, including when the users are at the airport.

The needs model of needs prediction module 164 may compare the difference between the two likelihoods to a threshold amount (e.g., ten percent, twenty percent, etc.) to determine whether the need for information for the particular context sufficiently outweighs the need for similar information in the broader context. For instance, the threshold amount may be twenty percent, or in other words, the needs model of needs prediction module 164 may require the need for information in the particular context to outweigh the need for the information in the broader context by at least twenty percent.

Responsive to determining that the first degree of likelihood exceeds the second degree of likelihood by a threshold amount, and that a current context of computing device 110A corresponds to the particular context, needs prediction module 164 may transmit, to computing device 110A, information for completing the task for the particular context. For example, after determining that the likelihood that a user of computing device 110A will need ground transportation at the airport in the foreign country is sufficiently greater than the likelihood that the user will need ground transportation anywhere in the country, needs prediction module 164 may cause search module 166 to execute a search for useful information related to taking ground transportation from the airport in the foreign country.

In some examples, the information for completing the task for the particular context that ISS 160 transmits to computing device 110A may be based on at least one search result from the search histories associated with the group of computing devices 110. For example, the information sent to computing device 110A may be some or all of the information that previous users obtained by performing a search in a particular context. In this way, ISS 160 is providing the information that the user is likely to search for anyway, without requiring the user to interact with his or her computing device 110A to execute the search.

In some examples, ISS 160 may refrain from transmitting, to computing device 110A, the information for completing the task for the particular context in response to determining that the first degree of likelihood does not exceed the second degree of likelihood by the threshold amount. For example, after determining that the likelihood that the user of computing device 110A will need ground transportation at the airport in the foreign country is not sufficiently greater than the likelihood that the user will need ground transportation anywhere in the country, needs prediction module 164 may refrain from causing search module 166 to execute a search for useful information related to taking ground transportation from the airport in the foreign country. Said differently, ISS 160 may not provide information for satisfying a predicted need if the need is not unique to a particular situation but, instead, is generally needed for many or all situations.

In any case, assuming the first degree of likelihood exceeds the second degree of likelihood by the threshold amount, and needs prediction module 164 causes search module 166 to execute a search for information related to a need, search module 166 may return information about the need. In some examples, the information may include one or more suggestions for traveling from a current location to a particular location. In some examples, the information may include the location of the taxi depot at the airport, whether tipping is appropriate in the foreign country, and other useful information about taking ground transportation from the airport in the foreign country. For example, search module 166 may determine that only local currency (e.g., no foreign currency or credit cards) are accepted by ground transportation drivers from the airport. Needs prediction module 164 may output information to computing device 110A including instructions for presenting user interface 114 at UID 112A to convey the information obtained by search module 166.

Upon receipt of the information from ISS 160, UI module 120A may cause UID 112A to output user interface 114 for display and in some examples, may cause computing device 110A output an audible alert as well to indicate to the user that useful information for satisfying his or her needs in the particular context is available at UID 112A. In this example, based on the information received from ISS 160, the user of computing device 110A may know to stop at the currency exchange kiosk before getting into a taxi.

Accordingly, when a user of a computing device that receives information from an example computing system that performs the techniques described herein is in an unfamiliar situation, the user may need not perform searches for information or otherwise provide input to his or her computing device to obtain information and facts that might assist the user in accomplishing a certain task to achieve a particular goal. Instead, the example system may automatically infer the needs of the user given the context of the situation and automatically provide the computing device with useful information that may satisfy the user's needs and assist the user in achieving the task or goal.

In this way, unlike other computing devices and systems that require that the user to provide inputs (e.g., search queries) and further, to be able to provide sufficient information (e.g., correct search query terms) for guiding the other computing devices and systems in locating the particular information that the user is searching for, the example system provides the needed information automatically. Even if the user is unaware of the tasks the user may need to complete, or the information the user should search for, to successfully navigate through the unfamiliar situation and achieve the particular goal, the example system will still automatically provide the needed information.

In addition, unlike other computing devices and systems, the example system may provide needed information that has a certain "Wow!" factor. In other words, by hinging the output of information for a particular context based on whether a first degree of likelihood of a task being performed by users of the group of computing devices for a particular context exceeds a second degree of likelihood of the task being performed by the users of the group of computing devices for a broader context that includes the particular context and at least one other context, by a threshold amount, the example computing system may be more likely to provide information that a user does not already know and/or had no way of knowing he or she would need for a particular context. The information the example system provides may include some of the more obscure facts or other nuanced information that is very specific for a user's particular situation (e.g., time, place, etc.) and that would only otherwise be known to very experienced users who have been in the particular situation before.

Consequently, the user need not have any prior knowledge of the various actions that the user may need to perform before encountering the unfamiliar situation. The user may experience less stress and spend less time providing input at a computing device to search for information as the user tries to obtain information necessary to achieve a particular goal. With less direct user interaction (e.g., input) from a user, the example system may conserve energy and use less battery power as compared to other systems that merely provide a user with capability to search for information.

Figure 2:
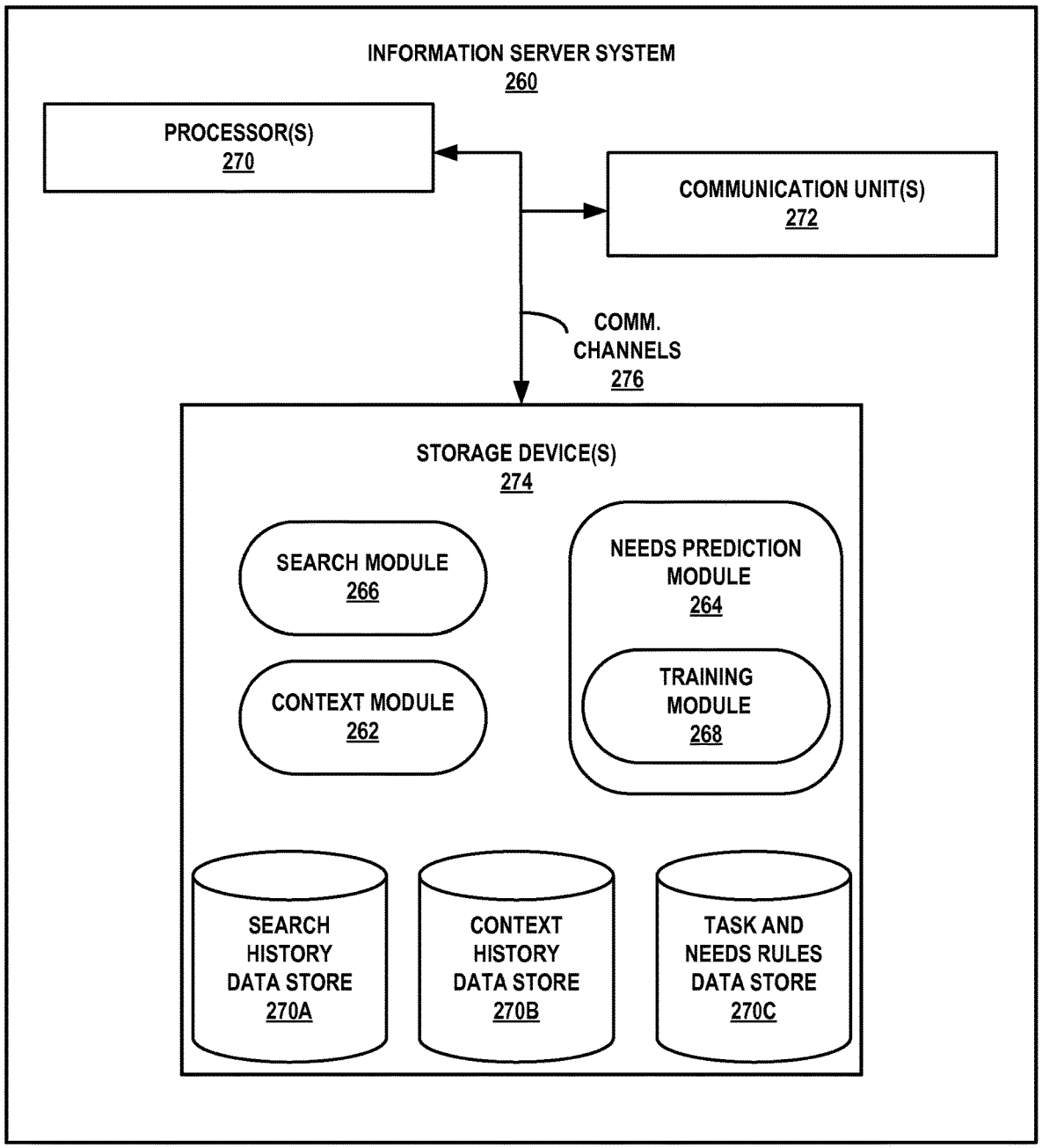
FIG. 2 is a block diagram illustrating an example computing system configured to predict the needs of a user of a computing device and provide information for satisfying the needs, in accordance with one or more aspects of the present disclosure.

FIG. 2 is a block diagram illustrating information server system (ISS) 260 as an example computing system configured to predict the needs of a user of a computing device, such as one of computing devices 110 of FIG. 1, and provide information for satisfying the needs, in accordance with one or more aspects of the present disclosure. ISS 260 is a more detailed example of ISS 160 of FIG. 1 and is described below within the context of system 100 of FIG. 1. FIG. 2 illustrates only one particular example of ISS 260, and many other examples of ISS 260 may be used in other instances and may include a subset of the components included in example ISS 260 or may include additional components not shown in FIG. 2.

ISS 260 provides computing devices 110 with a conduit through which a computing device, such as computing devices 110A, may execute searches for information related to search queries and in some examples, automatically receive information that ISS 260 predicts will satisfy the needs of users of computing devices 110, for a particular context. As shown in the example of FIG. 2, ISS 260 includes one or more processors 270, one or more communication units 272, and one or more storage devices 274. Storage devices 274 of ISS 260 include context module 262, needs prediction module 264, and search module 266. Within needs prediction module 264, storage devices 74 includes training module 268. Modules 262-266 include at least the same, if not more, capability as, respectively, modules 162-166 of FIG. 1.

Storage devices 274 of ISS 260 further include search history data store 270A, context history data store 270B, and task and needs rules data store 270C (collectively, "data stores 270"). Communication channels 276 may interconnect each of the components 270, 272, and 274 for intercomponent communications (physically, communicatively, and/or operatively). In some examples, communication channels 276 may include a system bus, a network connection, an inter-process communication data structure, or any other method for communicating data.

One or more communication units 272 of ISS 260 may communicate with external computing devices, such as computing devices 110 of FIG. 1, by transmitting and/or receiving network signals on one or more networks, such as network 130 of FIG. 1. For example, ISS 260 may use communication unit 272 to transmit and/or receive radio signals across network 130 to exchange information with computing devices 110. Examples of communication unit 272 include a network interface card (e.g. such as an Ethernet card), an optical transceiver, a radio frequency transceiver, a GPS receiver, or any other type of device that can send and/or receive information. Other examples of communication units 272 may include short wave radios, cellular data radios, wireless Ethernet network radios, as well as universal serial bus (USB) controllers.

One or more storage devices 274 within ISS 260 may store information for processing during operation of ISS 260 (e.g., ISS 206 may store data accessed by modules 262, 264, 266, and 268 during execution at ISS 260). In some examples, storage devices 274 are a temporary memory, meaning that a primary purpose of storage devices 274 is not long-term storage. Storage devices 274 on ISS 260 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 274, in some examples, also include one or more computer-readable storage media. Storage devices 274 may be configured to store larger amounts of information than volatile memory. Storage devices 274 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 274 may store program instructions and/or data associated with modules 262, 264, 266, and 268.

One or more processors 270 may implement functionality and/or execute instructions within ISS 260. For example, processors 270 on ISS 260 may receive and execute instructions stored by storage devices 274 that execute the functionality of modules 262, 264, 266, and 268. These instructions executed by processors 270 may cause ISS 260 to store information, within storage devices 274 during program execution. Processors 270 may execute instructions of modules 262, 264, 266, and 268 to learn and predict the needs of users of computing devices, for various contexts, given the previous actions of other users of other computing devices, for the same contexts, and automatically provide information that is relevant to the predicted needs of a user of a computing device, for a particular context. That is, modules 262, 264, 266, and 268 may be operable by processors 270 to perform various actions or functions of ISS 270 which are described herein.

Data stores 270 represent any suitable storage medium for storing information related to search histories (e.g., search terms, synonyms, related search terms, etc.), context histories (e.g., locations, times of day, device state information, user information, etc.) and rules (e.g., of a machine learning system) for predicting the needs of users of computing devices for various contexts. The information stored at data stores 270 may be searchable and/or categorized such that one or more modules 262-268 may provide an input requesting information from one or more of data stores 270 and in response to the input, receive information stored at data stores 270.

Search history data store 270A may be primarily maintained by search module 266 may be part of, or separate from, contextual history data store 270B which is generally maintained by context module 262. Search history data store 270A may include one or more searchable data bases or data structures that organize the different types of information that have been searched by individual computing devices, such as computing devices 110 of FIG. 1. For example, search history data store 270A may include rows devoted to individual or groups of computing devices and within each row, search history data store 270A may include information related to searches that search module 266 executed on behalf of the individual or groups computing devices. Examples of the types of information stored at data store 270A include search terms or queries, times of day and/or locations of the computing devices that are associated with the search terms, counts associated with the search terms that indicate how frequently or how often searches of the search terms occurred, an indication of whether a search of a search term was successful (e.g., whether the search result immediately in a subsequent search implying that the search was unsuccessful), and any and all other information related to searches performed by computing devices.

As indicated above, context history data store 270B may include some or all of search history data store 270A. Context history data store 270B includes organized and searchable, historical contextual information associated with individual or groups of computing devices, such as computing devices 110. They types of contextual information that may be stored at context history data store 270B includes, but is not limited to, location information, time of day information, sensor information (e.g., obtained from computing devices 110), user interest information, information about a devices operating state, application execution information (e.g., what and when was the application executed), and any and all other information that needs prediction module 264 may need to predict the needs of users.

Task and needs rules data store 270C includes one or more previously developed rules that needs prediction module 264 relies on to predict a task or action likely to be performed by a user of a computing device for a current context as well as information that the user may need to accomplish the task. For example, data store 270C may store rules of a machine learning or artificial intelligence system of needs prediction module 264. The machine learning or artificial intelligence system of needs prediction module 264 may access the rules of data store 270C to infer tasks and needs associated with users of computing devices 110 for a particular context.

In some examples, needs prediction module 264 may provide a current context of a computing device as input to data store 270C and receive as output, information pertaining to a task or action that a user of the computing device may need to perform in the current context and a broader context (that encompasses the current context). In some examples, the rules of data store 270C may output a degree of likelihood (e.g., a count, a probability, etc.) associated with the task or action for the current context and a similar degree of likelihood associated with the task or action for the broader context. And in some examples, needs prediction module 264 may provide the predicted task as input to data store 270C and receive as output, information pertaining to the types of information that the user may need in the current context to complete the predicted task.

Training module 268 of needs prediction module 264 may generate the rules stored at data store 270C for predicting and determining degrees of likelihood associated with tasks being performed by users for certain contexts. For example, a machine learning or artificial intelligence system of training module 268 may analyze the contextual information obtained by context module 262 and stored at data store 270B and identify correlations with the search information stored at data store 270A. Types of machine learning systems used by training module 268 include Bayesian networks, neural networks, and other types of artificial intelligent models. For example, training module 268 may develop a table with a row for each computing device 110 or group of computing device 110 that share similar contexts and similar search queries performed at the similar contexts. Based on the correlations between contextual information and search information associated with computing devices 110, training module 268 may develop rules for predicting future searches performed computing devices 110 for particular contexts.

For instance, training module 268 may determine a correlation exists between search queries related to terminal maps for a particular airport when a portion of computing devices 110 is located at or near that particular airport. Training module 268 may develop a rule that produces a high degree of likelihood that a computing device will execute a search for the terminal map of the airport when that device is located at that particular airport.

As another example, training module 268 may determine a correlation exists between search queries related to weather during the morning hours of a day when a portion of computing devices 110 is located at or near a respective home location associated with the portion of computing devices 110. Again, training module 268 may develop a rule that produces a medium degree of likelihood that a computing device will execute a search for the weather during morning hours of future days when that device is located at a home location. Training module 268 may produce any countless number of rules for predicting, based on passed observed actions, the types of future actions that users of computing devices 110 may perform for a particular context.

Training module 268 may learn probabilities P of users having various needs N according to contexts C in various ways. In some examples, training module 268 may determine P(N|C) using multinomials or counts. For example, training module 268 may determine how many times computing devices 110 performed searches for a terminal map of an airport, while in the airport, as compared the total quantity of searches performed from within the airport to determine a ratio of terminal map searches to total searches.

In some examples, training module 268 may determine P(N|C) using Bayes's Rule. For example, using Bayes's rule, training module 268 may use an equation such as EQ. 1;

$$P(N|C) \text{ is proportional to } P(N|C)*P(N) \quad \text{EQ. 1}$$

In EQ. 1, P(N) is the probability the user has a need N and P(C|N) is the probability the user would be in context C given that they have the need N. Or in other words, the posterior probability for a need given a context is proportional to the probability of the context given the need times the prior probability of the need.

Training module 268 may further perform aggregation techniques and clustering techniques on the contextual information and search histories to determine improved rules for predicting the needs of a user. For example, as training module 268 may calculate P(N|C) for each specific context determined by context module 262, training module 268 may aggregate the computed probabilities for specific contexts to determine probabilities for more general context. For example, training module 268 may determine a probability of a particular need for multiple individual airports and then aggregate the respective probabilities for each of the different airports into a single probability for all airports.

Training module 268 may perform clustering techniques to match similar actions observed by search module 266, with similar needs. For instance, training module 268 may determine that if two different search queries resulted in the same search results, that the two queries must be similar and therefore can be treated as similar, if not the same action or task, requiring similar needs.

Figure 3:
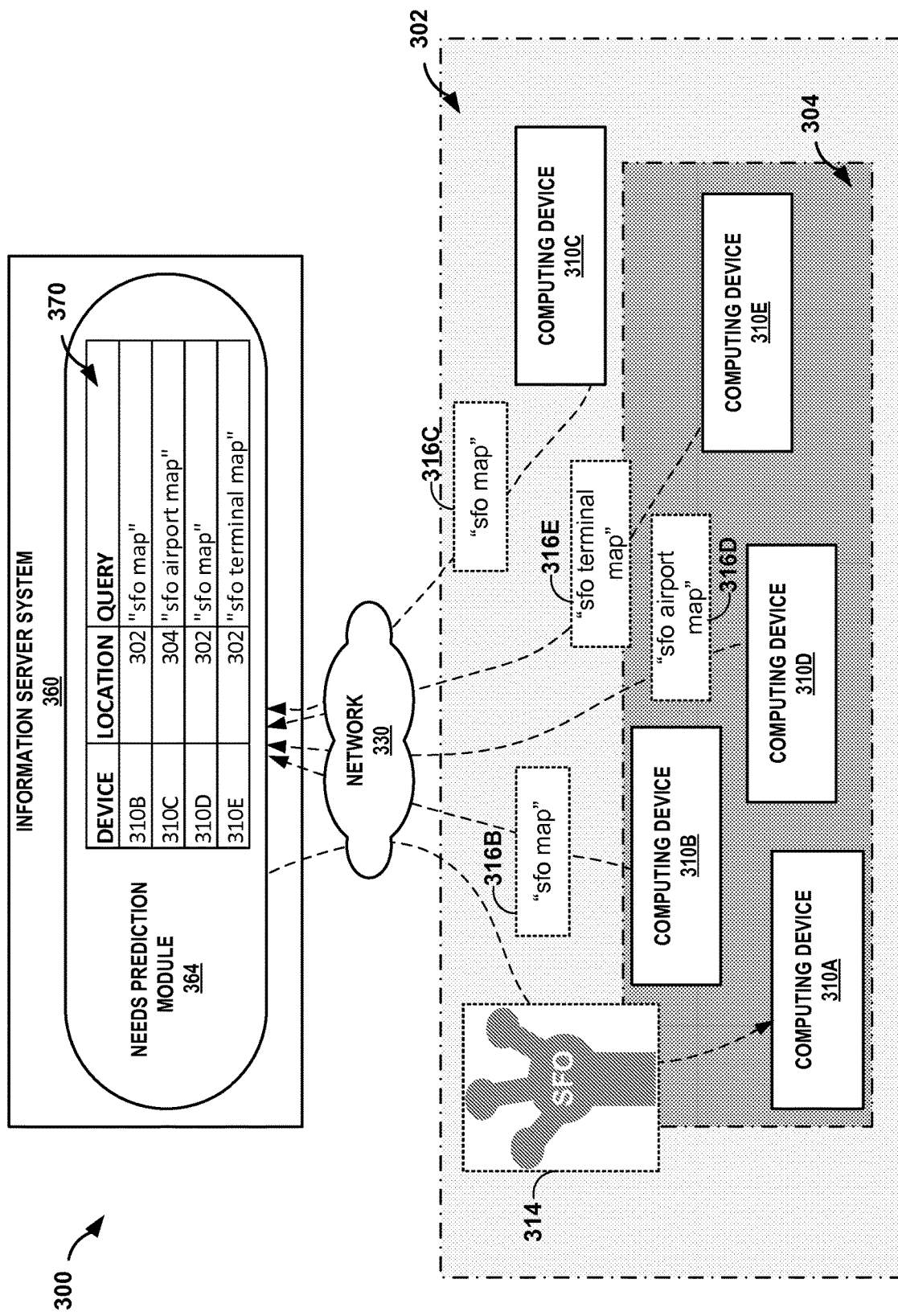
FIG. 3 is an additional conceptual diagram illustrating an example system for predicting the needs of a user of a computing device and providing information for satisfying the needs, in accordance with one or more aspects of the present disclosure.

FIG. 3 is an additional conceptual diagram illustrating system 300 including information server system (ISS) 360 as an example system for predicting the needs of a user of a computing device, such as one or more of computing devices 110 of FIG. 1, and providing information for satisfying the needs, in accordance with one or more aspects of the present disclosure. ISS 360 is an additional example of ISS 160 of FIG. 1 and ISS 260 of FIG. 2 and is described below within the context of system 100 of FIG. 1 and ISS 260 of FIG. 2.

System 300 includes ISS 360 in communication over network 330 with computing devices 310A-310N (collectively "computing devices 310"). ISS 360 includes needs prediction module 364 which may produce table 370 for matching observed actions or tasks performed by computing devices 310 with respective contexts (e.g., locations). Based on the information stored in table 370, needs prediction module 364 may determine when one of computing devices 310 may need information to perform a predicted task or action that needs prediction module 364 has identified, will probably need to take.

FIG. 3 shows computing devices 310A, 310B, 310D, and 310E being at location 304 which in this example is San Francisco Airport (SFO). Encompassing location 304 is location 302 that, in this example, represents the ten square kilometer region of the state of California that surrounds SFO. In other words, location 304 may represent a particular context that is associated with a first geographical area and location 302 may represent a broader context that is associated with a second geographical area that includes the first geographical area and at least one other geographical area.

In some examples, a particular and broader context may differ for reasons other than geographical area size. For example, a particular context may be associated with a first location and a broader context may be associated with multiple locations including the first location at least one other location. Consider the example where each of the multiple locations is associated with a same mode of transportation. For instance, a particular context may be a single airport and a broader context may include multiple airports. Other examples may be: a single place of business and multiple other places of business including the single place of business, one residential unit or home and multiple other homes that are not necessarily co-located, etc.

In some examples, a particular and broader context may differ for reasons other than location or geographical area size. For example, a particular context may encompass a first amount of time (e.g., an hour of a day) and a broader context may encompases a second amount of time that exceeds the first amount of time (e.g., multiple hours of the day).

Needs prediction module 364 may build table 370 based on contextual information and search queries received via network 330 from computing devices 310. Needs prediction module 364 receives: query 316B from computing device 310B while computing device 310B is located at location 304, query 316C from computing device 310C while computing device 310B is located at location 302, query 316D from computing device 310D while computing device 310D is located at location 304, and query 316E from computing device 310E while computing device 310E is located at location 304. From table 370, needs prediction module 364 may generate a rule that outputs a probability of a search being performed for a terminal map of SFO when one of computing devices 310 is at location 304 (e.g., inside SFO) and when one of computing devices 310 is inside location 302.

In the example of FIG. 3, a user of computing device 310A may travel on an airplane that arrives at location 304. While at location 304, computing device 310A may share over network 330, contextual information with ISS 360. Needs prediction module 364 may determine that computing device 310A is at location 302 and consult table 370 to determine whether the user of computing device 310A is likely to need some information to help the user perform a predicted task.

In some examples, whether ISS 360 provides information to computing device 310A for completing a task may hinge on whether the context associated with the user and/or computing device 310A is new or not. In other words, before providing information, needs prediction module 364 may determine whether the current context of computing device 310A is a new context not contained in a context history associated with the user of computing device 310A. If prediction module 364 determines that the context is not new, prediction module 364 may forgo providing information since prediction module 364 may assume that the user already knows how to complete the task and navigate the situation.

In any case, needs prediction module 364 may determine that because computing device 310A is located at location 302, that computing device 310A shares a similar context with computing devices 310B, 310C, and 310E each executed searches for an SFO terminal map. Based on the determination that computing device 310A shares the same context as devices 310B, 310C, and 310E, needs prediction module 364 may infer that the user of computing device 310A may perform a similar action and will probably execute a search for a terminal map of SFO. Therefore, rather than require the user of computing device 310A to input a search query as other users have done before to search for a terminal map, needs prediction module 364 may automatically provide information 314 which represents a graphical image of the terminal map that the user would otherwise likely need to search for.

In some examples, needs prediction module 364 may aggregate the information from table 370 with similar information related to other airports or other locations similar to locations 302 and 304 to determine a more general rule for the information that a user may need. Using the general rule, needs prediction module 364 may provide different information for completing the task for a different context that is exclusive of the particular context. For example, if the user landed at Los Angeles Airport (LAX), the user may still need a terminal map as if he or she had landed at SFO, however, rather than provide a graphical image of SFO, needs prediction module 364 may logically provide a terminal map of LAX.

In some examples, needs prediction module 364 may provide a service or a tool that enables third party application developers for computing devices 310 to query prediction module 364 for the needs of users based on observed actions. For example, a developer interested in showing content at one of computing devices 310 for financial information can look up the best context to output the financial information by querying needs prediction module 364 for "financial information." Needs prediction module 364 may analyze the context histories of devices that performed searches for stock ticker symbols, searches that search results pertaining to financial information, visits via devices 310 to financial related websites, and the opening of applications related to finance. Needs prediction module 364 may provide the developer with the context in which the need for financial information is triggered, in addition to potentially providing various metrics related to when and where the need is triggered, such as coverage, quality metrics, etc.

Figure 4A:
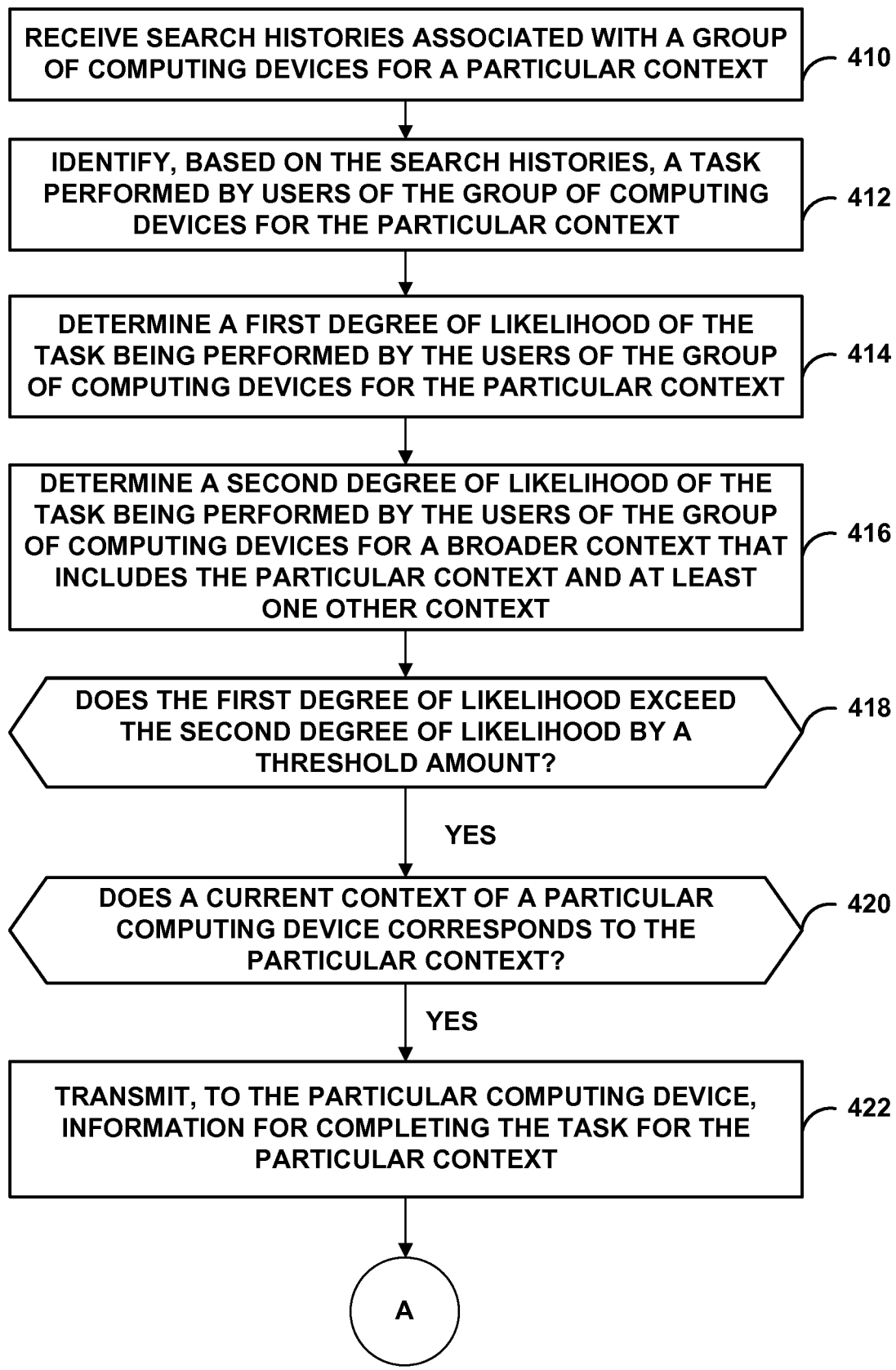
FIGS. 4A and 4B are flowcharts illustrating example operations performed by an example computing system configured to predict the needs of a user of a computing device and provide information for satisfying the needs, in accordance with one or more aspects of the present disclosure.
Figure 4B:
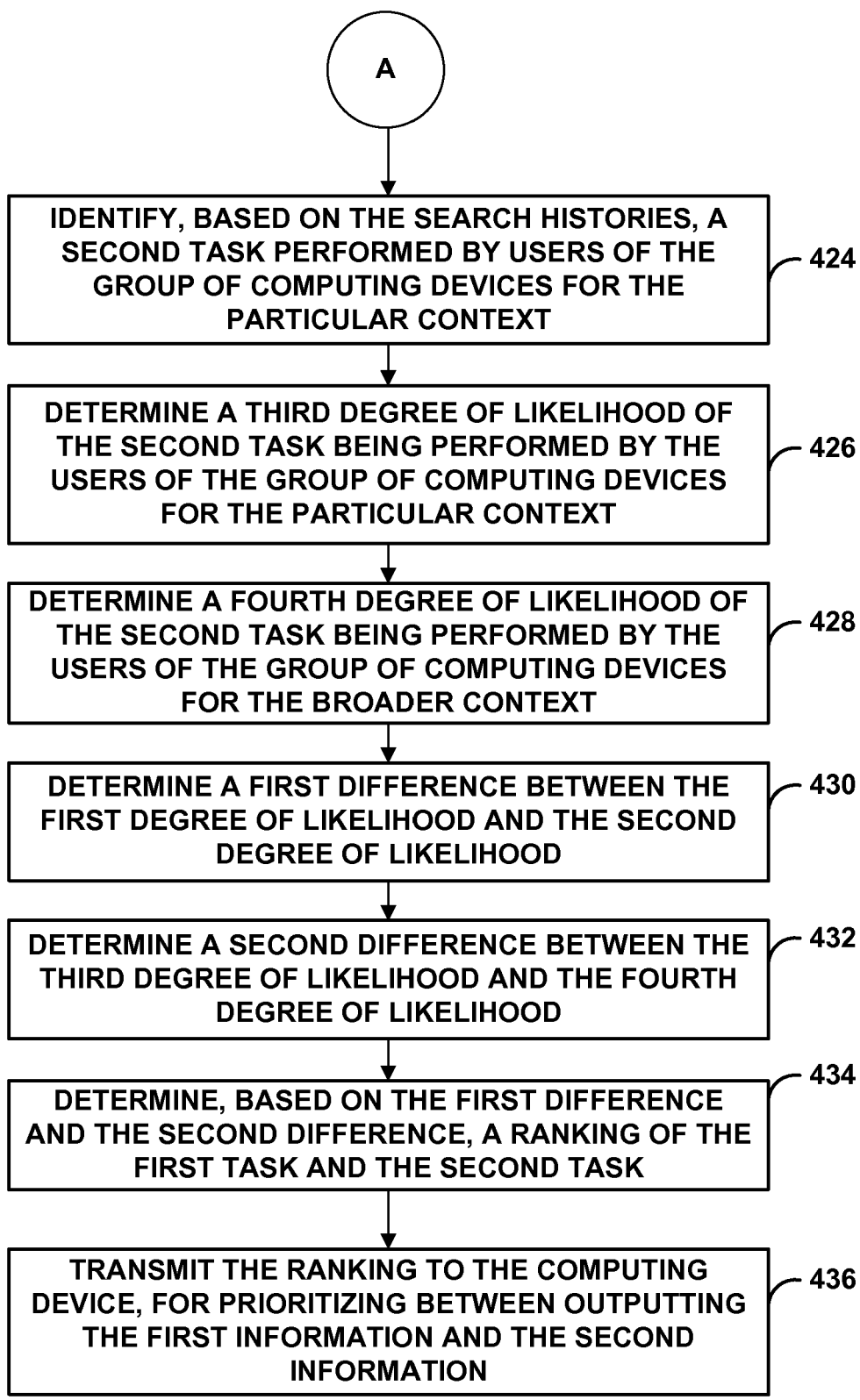

FIGS. 4A and 4B are flowcharts illustrating example operations 410-436 performed by an example computing system configured to predict the needs of a user of a computing device and provide information for satisfying the needs, in accordance with one or more aspects of the present disclosure. FIGS. 4A and 4B are described below in the context of system 100 of FIG. 1. For example, ISS 160 may perform operations 410-436 for predicting the needs of a user of computing device 110A and providing information for satisfying the needs, in accordance with one or more aspects of the present disclosure.

As shown in FIG. 4A, in operation, ISS 160 may receive search histories associated with a group of computing devices for a particular context (410). For example, users of computing devices 110 may causes respective query modules 122 to send search queries to ISS 160 to execute searches for information. In addition to executing searches of the search queries, search module 166 may store the search queries, and/or results, to generate one or more search histories associated with each of computing devices 110.

ISS 160 may identify, based on the search histories, a task performed by users of the group of computing devices for the particular context (412). For example, a needs model of needs prediction module 164 may determine one or more correlations between the context of computing devices 110 and the search histories generated in each of the contexts and infer one or more searches that computing devices 110 may perform, when in similar contexts.

ISS 160 may determine a first degree of likelihood of the task being performed by the users of the group of computing devices for the particular context (414). For example, for each potential task for any given context, needs prediction module 164 may determine a quantity of searches, from the search histories associated with the group of computing devices 110 that are related to each of the tasks. Needs prediction module 164 may determine that those tasks that have a greater quantity of searches have a higher likelihood of being a task that may be performed by a user, for the particular context.

In some examples, needs prediction module 164 may determine the first degree of likelihood based at least in part on a first quantity of searches (i.e., a first count of searches), from the search histories associated with the group of computing devices 110 for a particular context, that are related to the task and a total quantity of searches (i.e., a total count of searches), from the search histories associated with the group of computing devices for the particular context. Said differently, rather than rely on counts per se, needs prediction module 164 may modulate specific counts in order to rely on percentages or ratios for each task being performed as compared to all the tasks being performed in a particular context, to determine a degree of likelihood of a particular task being performed for a given context.

As used herein, needs prediction module 164 may infer that a search is "related to a task" or "associated with a task" based on one or more of the machine learning rules needs prediction module 164 has access to for predicting the needs of users based on actions. The rules may be based on an assumption that the searches that lead to the same results or cause similar actions are related to the same needs. For example, if users input searches for terminal maps, airport ground transportation, locations of baggage areas, etc. at a search engine input, the search engine may produce as a top result, an airport terminal map. Therefore, needs prediction module 164 may infer that searches for terminal maps, airport ground transportation, locations of baggage areas, are all related to the need for an airport terminal map.

ISS 160 may determine a second degree of likelihood of the task being performed by the users of the group of computing devices for a broader context that includes the particular context and at least one other context (416). For example, for each potential task for broader contexts, needs prediction module 164 may determine an additional quantity of searches, from the search histories associated with the group of computing devices 110 that are related to each of the tasks. Needs prediction module 164 may determine that those tasks that have a greater quantity of searches for the broader contexts also have a higher likelihood of being a task that may be performed by a user, for the broader context.

ISS 160 may determine whether the first degree of likelihood exceeds the second degree of likelihood by a threshold amount (418). For example, rather than provide information for completing a task each and every time ISS 160 deems that a person may need information to complete a task, needs prediction module 164 may determine whether the need is truly unique for a particular context or instead, whether the need is well known given the popularity of the need in broader contexts.

Responsive to determining the first degree exceeds the second degree by a threshold amount, ISS module 160 may determine whether the current context of a particular computing device 110 corresponds to the particular context (420) that is associated with the inferred task. For example, with the model used by needs prediction module 164 trained, needs prediction module 164 may input contextual information about computing devices 110 into the model to determine whether the current context of any of computing devices 110, relates or corresponds to a context with an observed need. Prediction module 164 may determine that computing device 110A has a context that is typically associated with the need for information about ground transportation from an airport in a foreign country.

Responsive to determining the current context of the particular computing device 110 corresponds to the particular context, ISS 160 may transmit, to the particular computing device, information for completing the task for the particular context (422). For example, responsive to determining that a user of computing device 110A may be in a situation in which the user is needing a taxi service, needs prediction module 164 may query search module 166 for information about taking taxis from the particular airport in the foreign country. Needs prediction module 164 may package the information retrieved by search module 166 as content for presentation at UID 112A at computing device 110A and transmit the content as data over network 130 to UI module 120A. UI module 120A may configure UID 112A to present the content (e.g., at a display).

As shown in FIG. 4B, in operation, ISS 160 may identify, based on the search histories, a second task performed by users of the group of computing devices for the particular context (424). For example, in addition to determining that users search for ground transportation information at the airport in the foreign country, needs prediction module 164 may also determine that users of computing devices 110 often search for a terminal map of the airport.

ISS 160 may determine a third degree of likelihood of the second task being performed by the users of the group of computing devices for the particular context (426) and may further determine a fourth degree of likelihood of the second task being performed by the users of the group of computing devices for the broader context that includes the particular context and at least one other context (428). For example, similar to operations 414 and 416 described above, needs prediction module 164 may determine respective degrees of likelihood associated with the task of searching for a terminal map both in the context of the airport in the foreign country and in the context of the entire foreign country.

In some examples, responsive to determining that the third degree of likelihood exceeds the fourth degree of likelihood by the threshold amount, and that the current context of the particular computing device corresponds to the particular context, ISS 160 may transmit, to the particular computing device, second information for completing the second task for the particular context. For example, just like with operations 418-422 described above, responsive to determining that a user of computing device 110A may be in a situation in which the user is needing a terminal map, needs prediction module 164 may query search module 166 for information about terminal maps for the particular airport in the foreign country. Needs prediction module 164 may package the information retrieved by search module 166 as content for presentation at UID 112A at computing device 110A and transmit the content as data over network 130 to UI module 120A where UI module 120A may configure UID 112A to present the content (e.g., at a display).

ISS 160 may determine a ranking of the first and second tasks and provide the ranking to computing device 110A so that computing device 110A can discern which information to show at UID 112A (e.g., the terminal map or the taxi information).

To determine the ranking, ISS 160 may determine a first difference between the first degree of likelihood and the second degree of likelihood (430) and determine a second difference between the third degree of likelihood and the fourth degree of likelihood (432). Based on the first difference and the second difference, ISS 160 may determine the ranking of the first task and the second task. For example, the ranking of the first and second tasks may not necessarily be based on which task has the most counts or highest probability for a particular context. Instead, the ranking may be based on which task has the most counts or highest probability for a particular context as compared to a threshold. The threshold may be representative of the total quantity of counts or probability for the broader context. In other words, ISS 160 may rank the task that is more unique for the particular situation higher with the rationale that the more unique task is less likely to be known or understood by a user in a new situation.

For example, needs prediction module 164 may determine a first quantity of searches, from the search histories associated with the group of computing devices for the particular context, that are related to or otherwise associated with the first task and a second quantity of searches, from the search histories associated with the group of computing devices for the particular context, that are related to or otherwise associated with the second task. Then, needs prediction module 164 may rank the two tasks based on the two quantities as they compare to respective quantities of the first and second tasks, for broader contexts.

In any case, after ranking the two tasks, ISS 160 may transmit the ranking to the computing device for prioritizing between outputting the first information and the second information (436). For example, needs prediction module 164 may output information over network 130 that indicates the ranking between presenting the terminal map or the taxi information. Upon receipt of the ranking, UI module 120A may cause UID 112A to present the higher ranked information first.

ISS 160 may base the ranking of needs and tasks based on the idea that since actions are observable using action logs (e.g., search histories), it is possible to mine the action logs and count how often a need or task occurred for a given need and context. In this way, ISS 160 can compare the counts associated for different tasks as a way to compare the needs relative to each other (e.g., important for scoring/ranking), and in absolute terms (e.g., important for triggering when to show or transmit the need).

For instance, ISS 160 may rely on a scoring function s(N,C) that is used to rank candidate needs N as a function f based on the probability P(N|C) the user has the need N given the user context C as shown in EQ. 2:

$$N^* = \mathrm{argmax}_N P(N|C)/P(N) \qquad \text{EQ. 2}$$

Given a particular user context C, ISS 160 may use P(N|C) to predict the top candidate needs, possibly as input to a function that modulates the probability of a popular Need vs the "Wow" factor of an interesting Need (e.g., to "lift" an interesting need over a popular need). That is, the probability of the need given the context divided by the background probability for the need. For example, based on the relationship shown in EQ. 3:

$$N^* = \mathrm{argmax}_N P(N|C)/P(N|C) \qquad \text{EQ. 3}$$

In some examples, rather than use probabilities, ISS 160 may score needs or tasks based on counts. EQ. 4 defines a need score as:

$$\text{score} = \#\text{Observed} - \#\text{Expected(Background)} - \#\text{Noise}(\#\text{Observed}) \qquad \text{EQ. 4}$$

In this derivation, #Observed is the number of times an action has been observed by needs prediction module 164 in the search histories and/or contextual information of computing devices 110, #Expected(Background) is the expected number of times ISS 160 expects to observe an action in the current context assuming the action appears similarly in the given background (e.g., [#count in Background/#all counts in Background]×#all counts in context). Lastly, Noise(#Observed) is a normalization factor to account ISS 160 determining that actions with low counts may not be relevant for needs prediction. In some examples, a formulation of #Noise (#observed) may be a smooth function such as an inverse sigmoid function. A simple formulation for Noise(#Observed) could be the function shown in EQ. 5:

$$\begin{aligned}&\#\text{Noise}(\#\text{Observed}) = \#\text{Observed, if } \#\text{Observed} < 10 \\ &\#\text{Noise}(\#\text{Observed}) = 0, \text{ otherwise}\end{aligned} \qquad \text{EQ. 5}$$

Clause 1. A method comprising: identifying, by a computing system, based on search histories associated with a group of computing devices for a particular context, a task performed by users of the group of computing devices for the particular context; determining, by the computing system, a first degree of likelihood of the task being performed by the users of the group of computing devices for the particular context; determining, by the computing system, a second degree of likelihood of the task being performed by the users of the group of computing devices for a broader context that includes the particular context and at least one other context; and responsive to determining that the first degree of likelihood exceeds the second degree of likelihood by a threshold amount, and that a current context of a particular computing device corresponds to the particular context, transmitting, by the computing system, to the particular computing device, information for completing the task for the particular context.

Clause 2. The method of any of clause 1, wherein the information for completing the task for the particular context is further transmitted in response to determining that the current context is a new context not contained in a context history associated with the user of the computing device.

Clause 3. The method of any of clauses 1-2, wherein the information for completing the task for the particular context is first information, the method further comprising: determining, by the computing system, second information, different from the first information, for completing the task for a different context that is exclusive of the particular context.

Clause 4. The method of any of clauses 1-2, wherein the first degree of likelihood is determined based at least in part on a quantity of searches, from the search histories associated with the group of computing devices for the particular context, that are associated with the task.

Clause 5. The method of clause 4, wherein: the quantity of searches are a first quantity of searches from first search histories associated with a first group of computing devices for the particular context, and the second degree of likelihood is determined based at least in part on a second quantity of searches, from second search histories associated with a second group of computing devices for the broader context, that are associated with the task.

Clause 6. The method of any of clauses 1-5, wherein the particular context encompasses a first amount of time and the broader context encompasses a second amount of time greater than the first amount of time.

Clause 7. The method of any of clauses 1-6, wherein the particular context is associated with a first geographical area and the broader context is associated with a second geographical area that includes the first geographical area and at least one other geographical area.

Clause 8. The method of any of clauses 1-7, wherein the information for completing the task for the particular context is based on at least one search result from the search histories associated with the group of computing devices.

Clause 9. A computing system comprising: at least one processor; and at least one module operable by the at least one processor to: identify, based on search histories associated with a group of computing devices for a particular context, a task performed by users of the group of computing devices for the particular context; determine a first degree of likelihood of the task being performed by the users of the group of computing devices for the particular context; determine a second degree of likelihood of the task being performed by the users of the group of computing devices for a broader context that includes the particular context and at least one other context; and responsive to determining that the first degree of likelihood exceeds the second degree of likelihood by a threshold amount, and that a current context of a particular computing device corresponds to the particular context, transmit, to the particular computing device, information for completing the task for the particular context.

Clause 10. The computing system of clause 9, wherein the particular context is associated with a first geographical area and the broader context is associated with a second geographical area that includes the first geographical area and at least one other geographical area.

Clause 11. The computing system of any of clauses 9-10, wherein the first degree of likelihood is determined based at least in part on a first quantity of searches, from the search histories associated with the group of computing devices for the particular context, that are associated with the task and a total quantity of searches, from the search histories associated with the group of computing devices for the particular context.

Clause 12. The computing system of any of clauses 9-11, wherein the particular context is associated with a first location and the broader context is associated with multiple locations including the first location at least one other location.

Clause 13. The computing system of any of clause 12, wherein each of the multiple locations is associated with a same mode of transportation.

Clause 14. The computing system of any of clauses 9-13, wherein the group of computing devices excludes the particular computing device.

Clause 15. The computing system of any of clauses 9-14, wherein the at least one module is further operable by the at least one processor to refrain from transmitting, to the particular computing device, the information for completing the task for the particular context in response to determining that the first degree of likelihood does not exceed the second degree of likelihood by the threshold amount.

Clause 16. A computer-readable storage medium comprising instructions that, when executed, configure one or more processors of a computing system to: identify, based on search histories associated with a group of computing devices for a particular context, a task performed by users of the group of computing devices for the particular context; determine a first degree of likelihood of the task being performed by the users of the group of computing devices for the particular context; determine a second degree of likelihood of the task being performed by the users of the group of computing devices for a broader context that includes the particular context and at least one other context; and responsive to determining that the first degree of likelihood exceeds the second degree of likelihood by a threshold amount, and that a current context of a particular computing device corresponds to the particular context, transmit, to the particular computing device, information for completing the task for the particular context.

Clause 17. The computer-readable storage medium of clause 16, wherein the task is a first task, the information is first information, and the instructions, when executed, further configure the one or more processors of the computing system to: determine a third degree of likelihood of a second task being performed by the users of the group of computing devices for the particular context, wherein the second task is further identified based on the search histories associated with the group of computing devices for the particular context; and determine a fourth degree of likelihood of the second task being performed by the users of the group of computing devices for the broader context that includes the particular context and at least one other context; and responsive to determining that the third degree of likelihood exceeds the fourth degree of likelihood by the threshold amount, and that the current context of the particular computing device corresponds to the particular context, transmit, to the particular computing device, second information for completing the second task for the particular context.

Clause 18. The computer-readable storage medium of clause 17, wherein the instructions, when executed, further configure the one or more processors of the computing system to: determine a first difference between the first degree of likelihood and the second degree of likelihood; determine a second difference between the third degree of likelihood and the fourth degree of likelihood; determine, based on the first difference and the second difference, a ranking of the first task and the second task; and transmit, to the computing device, for prioritizing between outputting the first information and the second information, the ranking.

Clause 19. The computer-readable storage medium of clause 18, wherein the instructions, when executed, further configure the one or more processors of the computing system to determine the ranking of the first and second tasks based on: a first quantity of searches, from the search histories associated with the group of computing devices for the particular context, that are associated with the first task; and a second quantity of searches, from the search histories associated with the group of computing devices for the particular context, that are associated with the second task.

Clause 20. The computer-readable storage medium of any of clauses 16-19, wherein the task includes navigating to a particular location from a current location of the particular computing device and the information comprises one or more suggestions for traveling from the current location to the particular location.

Clause 21. The computing system of clause 9, comprising means for performing any of the methods of clauses 1-8.

Clause 22. The computer-readable storage medium of clause 16, comprising further instructions that, when executed configure the one or more processors of the computing system of clause 9 to perform any of the methods of clauses 1-8.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method performed by one or more processors, comprising:
    identifying that a first computing device has a first current context;
    determining, based on histories associated with additional computing devices:
        that a first degree of likelihood of a task for the first current context exceeds a second degree of likelihood of the task for a broader context that includes the first current context and at least one other context;
    in response to determining that the first degree of likelihood of the task for the first current context exceeds the second degree of likelihood of the task for the broader context, and in response to identifying the first computing device has the first current context:
        causing the first computing device to output information for assisting a first user of the first computing device in completing the task for the first current context;
    identifying that a second computing device has a second current context, the second current context differing from the first current context;
    determining, based on the histories associated with the additional computing devices:
        that a third degree of likelihood of the task for the second current context does not exceed: the second degree of likelihood of the task for the broader context;
    in response to determining that the third degree of likelihood of the task for the second current context does not exceed the second degree of likelihood of the task for the broader context, and in response to identifying the second computing device has the second current context:
        refraining from causing the second computing device to output any information for assisting a second user of the second computing device in completing the task for the second current context.

2. The method of claim 1, wherein identifying that the first computing device has the first current context is based at least in part on sensor information from one or more sensors of the first computing device.

3. The method of claim 1, wherein identifying that the first computing device has the first current context is based at least in part on information about an operating state of the first computing device.

4. The method of claim 3, wherein the information about the operating state of the first computing device includes information about an application that is executed by the first computing device at a given time.

5. The method of claim 1, wherein causing the first computing device to output information for assisting a first user of the first computing device in completing the task for the first current context is further in response to determining that the first current context is a new context not contained in a context history associated with the first user of the first computing device.

6. The method of claim 1, wherein the histories include search histories.

7. The method of claim 1, wherein the first current context is associated with a first geographical area and the broader context is associated with a second geographical area that includes the first geographical area and at least one other geographical area.

8. The method of claim 1, wherein the first current context encompasses a first amount of time and the broader context encompasses a second amount of time greater than the first amount of time.

9. A computing system comprising:
    at least one processor configured to:
        identify that a first computing device has a first current context;
        determine, based on histories associated with additional computing devices:

that a first degree of likelihood of a task for the first current context exceeds a second degree of likelihood of the task for a broader context that includes the first current context and at least one other context;

in response to determining that the first degree of likelihood of the task for the first current context exceeds the second degree of likelihood of the task for the broader context, and in response to identifying the first computing device has the first current context:

cause the first computing device to output information for assisting a first user of the first computing device in completing the task for the first current context;

identify that a second computing device has a second current context, the second current context differing from the first current context;

determine, based on the histories associated with the additional computing devices:

that a third degree of likelihood of the task for the second current context does not exceed: the second degree of likelihood of the task for the broader context;

in response to determining that the third degree of likelihood of the task for the second current context does not exceed the second degree of likelihood of the task for the broader context, and in response to identifying the second computing device has the second current context:

refrain from causing the second computing device to output any information for assisting a second user of the second computing device in completing the task for the second current context.

10. The computing system of claim 9, wherein in identifying that the first computing device has the first current context, the at least one processor is configured to identify that the first computing device has the first current context based at least in part on sensor information from one or more sensors of the first computing device.

11. The computing system of claim 9, wherein in identifying that the first computing device has the first current context, the at least one processor is configured to identify that the first computing device has the first current context based at least in part on information about an operating state of the first computing device.

12. The computing system of claim 11, wherein the information about the operating state of the first computing device includes information about an application that is executed by the first computing device at a given time.

13. The computing system of claim 9, wherein causing the first computing device to output information for assisting a first user of the first computing device in completing the task for the first current context is further in response to determining that the first current context is a new context not contained in a context history associated with the first user of the first computing device.

14. The computing system of claim 9, wherein the histories include search histories.

15. The computing system of claim 9, wherein the first current context is associated with a first geographical area and the broader context is associated with a second geographical area that includes the first geographical area and at least one other geographical area.

16. The computing system of claim 9, wherein the first current context encompasses a first amount of time and the broader context encompasses a second amount of time greater than the first amount of time.

17. A computer-readable storage medium comprising instructions that, when executed, configure one or more processors of a computing system to:

identify that a first computing device has a first current context;

determine, based on histories associated with additional computing devices:

that a first degree of likelihood of a task for the first current context exceeds a second degree of likelihood of the task for a broader context that includes the first current context and at least one other context;

in response to determining that the first degree of likelihood of the task for the first current context exceeds the second degree of likelihood of the task for the broader context, and in response to identifying the first computing device has the first current context:

cause the first computing device to output information for assisting a first user of the first computing device in completing the task for the first current context;

identify that a second computing device has a second current context, the second current context differing from the first current context;

determine, based on the histories associated with the additional computing devices:

that a third degree of likelihood of the task for the second current context does not exceed: the second degree of likelihood of the task for the broader context;

in response to determining that the third degree of likelihood of the task for the second current context does not exceed the second degree of likelihood of the task for the broader context, and in response to identifying the second computing device has the second current context:

refrain from causing the second computing device to output any information for assisting a second user of the second computing device in completing the task for the second current context.

* * * * *